US011758060B2

(12) United States Patent
Tsurumaki (10) Patent No.: US 11,758,060 B2
(45) Date of Patent: Sep. 12, 2023

(54) INFORMATION PROCESSING APPARATUS, METHOD OF CONTROLLING INFORMATION PROCESSING APPARATUS, AND STORAGE MEDIUM

(71) Applicant: Canon Kabushiki Kaisha, Tokyo (JP)

(72) Inventor: Shota Tsurumaki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/979,208

(22) Filed: Nov. 2, 2022

(65) Prior Publication Data
US 2023/0156128 A1    May 18, 2023

(30) Foreign Application Priority Data

Nov. 15, 2021  (JP) ................................ 2021-186022

(51) Int. Cl.
*H04N 1/00* (2006.01)
*H04N 1/32* (2006.01)
(52) U.S. Cl.
CPC ..... *H04N 1/00212* (2013.01); *H04N 1/00514* (2013.01); *H04N 1/32128* (2013.01); *H04N 1/32368* (2013.01); *H04N 2201/0094* (2013.01); *H04N 2201/3204* (2013.01); *H04N 2201/3273* (2013.01)

(58) Field of Classification Search
CPC ........... H04N 1/00212; H04N 1/00514; H04N 1/00517
See application file for complete search history.

(56) References Cited

U.S. PATENT DOCUMENTS

| | | | | |
|---|---|---|---|---|
| 2020/0169522 | A1* | 5/2020 | Lee | H04L 51/224 |
| 2020/0274726 | A1* | 8/2020 | Setteboun | G06F 3/04817 |
| 2022/0400139 | A1* | 12/2022 | Walling | H04L 65/403 |
| 2023/0078804 | A1* | 3/2023 | Enamito | G10L 25/84 |

FOREIGN PATENT DOCUMENTS

JP    2018022336 A    2/2018

* cited by examiner

*Primary Examiner* — Benjamin O Dulaney
(74) *Attorney, Agent, or Firm* — Venable LLP (57) ABSTRACT

According to an aspect of the present invention, an information processing apparatus comprises receiving a selection of a channel for a destination of a document image, obtaining information of users belonging to the channel for the destination from an information sharing service, displaying a button for each of the obtained information of users on a screen, and if the button is pressed, displaying a message including a user corresponding to the pressed button as a recipient in an input field of the screen, and transmitting the message inputted on the screen and the document image to the channel of the information sharing service.

8 Claims, 10 Drawing Sheets

INFORMATION PROCESSING APPARATUS, METHOD OF CONTROLLING INFORMATION PROCESSING APPARATUS, AND STORAGE MEDIUM

BACKGROUND

Field

The present disclosure relates to an information processing apparatus, a method of controlling the information processing apparatus, and a storage medium for transmitting scanned document images to a specific person via an information sharing service.

Description of the Related Art

Traditionally, there is a system scanning a document, attaching the scanned document to a message on email or an information-sharing service (for example, a chat application), and transmitting the scanned document directly. If the scanned document is transmitted as an email attachment, a destination address is inputted. If the scanned document is transmitted as a message in a chat application, a destination group (channel) is selected.

If the scanned document is transmitted in a system using the above chat application, anyone in the group can access the scanned document because the scanned document is transmitted to a specific group.

Japanese Patent Application Laid-Open No. 2018-22336 discloses that if a file is shared in a group to which a plurality of members belongs, a transmitter can give file sharing permission to members by authorizing the members to operate on the file.

However, the method of Japanese Patent Application Laid-Open No. 2018-22336 does not disclose that the scanned document is transmitted to a specific user in the group. There is also a time constraint that the user cannot view the file until the viewing rights are approved for the user.

Therefore, the present disclosure makes it easy to specify that a scanned document is addressed to a specific user in a group when setting a group of destination of the scanned document.

SUMMARY

According to an aspect of the present invention, an information processing apparatus comprises a memory that stores instructions and a processor that executes the instructions to perform receiving a selection of a channel for a destination of a document image, obtaining information of users belonging to the channel for the destination from an information sharing service, displaying a button for each of the obtained information of users on a screen, and if the button is pressed, displaying a message including a user corresponding to the pressed button as a recipient on an input field of the screen, and transmitting the message inputted on the screen and the document image to the channel of the information sharing service.

Further features of the present invention will become apparent from the following description of exemplary embodiments with reference to the attached drawings.

DESCRIPTION OF THE EMBODIMENTS

Embodiments of the present invention will be described in detail below with reference to the drawings.

It should be noted that the following embodiment does not limit the invention claimed, and not all combinations of features described in the embodiment are essential to the means of solving the disclosure.

Figure 1:
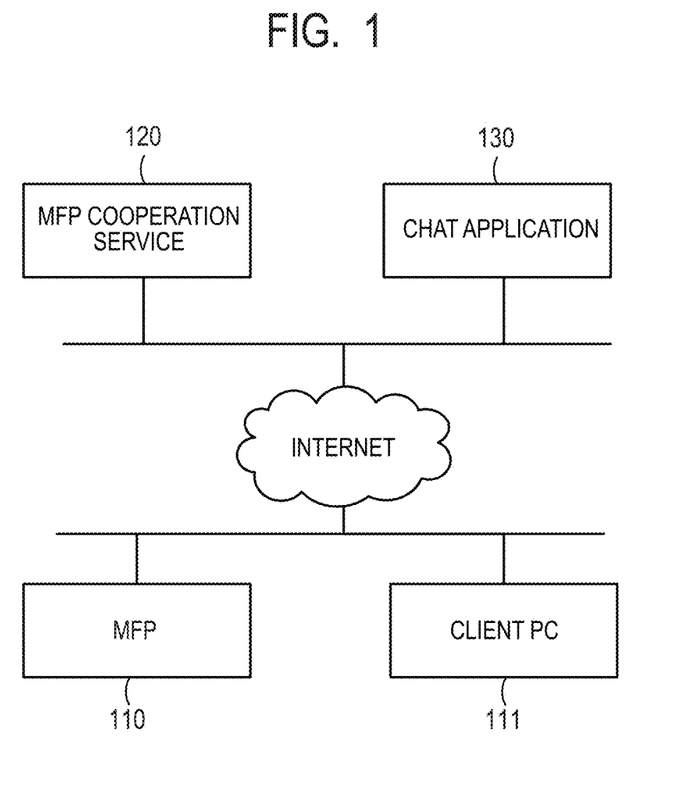
FIG. 1 illustrates a diagram showing the overall configuration of the system of the present embodiment.

FIG. 1 illustrates the overall configuration of the present system. An image processing system includes an MFP (Multifunction Peripheral) 110, a client PC 111, an MFP cooperation service 120, and a chat application 130 as an information sharing service. The MFP 110 and the client PC 111 are communicably connected via a LAN (Local Area Network) to a server providing various services on the internet.

The MFP 110 is a multifunction device with multiple functions such as a scanner and a printer, and is an example of an image processing apparatus. The client PC 111 executes an application that receives a requested service from the MFP cooperation service 120 running on the information processing apparatus. The MFP cooperation service 120 is an example of a service that has the function of storing image files scanned by the MFP 110 on its own server or transferring the scanned files to a service that can store files, such as other storage services. The chat application 130 that is an information sharing service, is a service that allows users to store files via the internet and obtain files via a web browser.

The image processing system in the present embodiment includes the MFP 110, the client PC 111, the MFP cooperation service 120, and the chat application 130 but is not limited to. For example, the MFP 110 may also serve as the client PC 111 and the MFP cooperation service 120.

Further, the MFP cooperation service 120 may be arranged in a server on a LAN rather than on the internet. The chat application 130 can also be replaced with a mail server or the like to transmit scanned images as attachments to emails.

Figure 2:
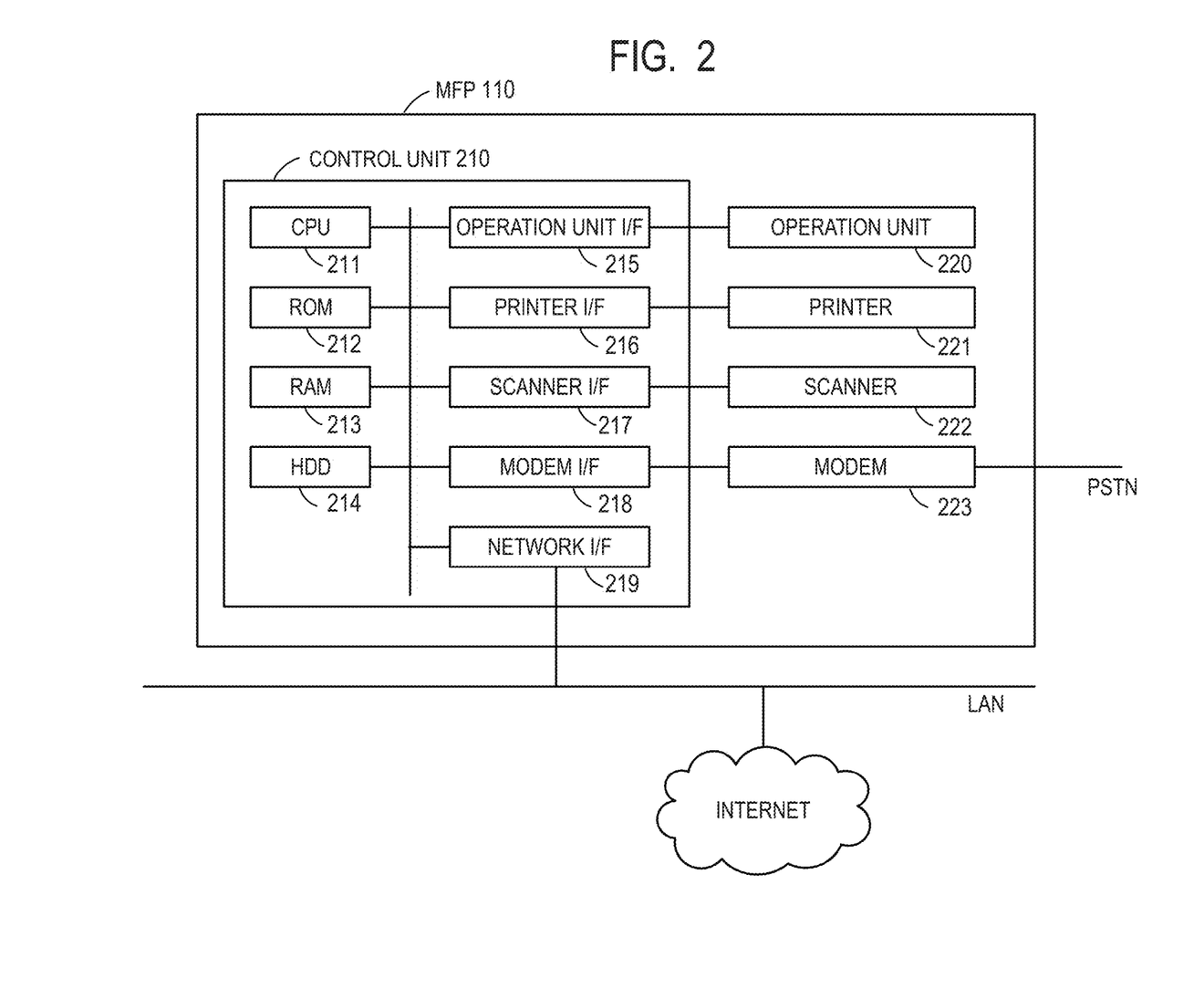
FIG. 2 illustrates a hardware configuration of an MFP.

FIG. 2 illustrates a hardware configuration of the MFP 110. The MFP 110 includes a control unit 210, an operation unit 220, a printer 221, a scanner 222, and a modem 223. The control unit 210 includes the following units 211 to 219 and controls the operation of the entire MFP 110. A CPU 211 reads the control program stored in a ROM 212 to execute and control various functions of the MFP 110 such as scanning/printing/communication. A RAM 213 is used as a temporary storage area such as a main memory and a work area of the CPU 211. In the present embodiment, one CPU 211 uses one memory (the RAM 213 or a HDD 214) to perform each of the processes described in a flowchart below, but this is not limited to the above. For example, multiple CPUs or multiple RAMs or HDDs may cooperate to execute each process. The HDD 214 is a mass storage unit that stores image data and various programs.

An operation unit I/F 215 is an interface connecting the operation unit 220 and the control unit 210. The operation unit 220 includes a touch panel, keyboard, and the like, and receives operations/inputs/instructions from the user. A printer I/F 216 is an interface connecting the printer 221 and the control unit 210. The image data for printing is transferred from the control unit 210 to the printer 221 via the printer/F 216 and printed on the recording medium. A scanner I/F 217 is an interface connecting the scanner 222 and the control unit 210. The scanner 222 scans a document set on a document stage (not shown) or an ADF (Auto Document Feeder) to generate image data, which is input to a control unit 210 via the scanner I/F 217. The MFP 110 can print out (copy) the image data generated by the scanner 222 using the printer 221, and can also transmit files and emails. A modem I/F 218 is an interface connecting the modem 223 and the control unit 210. The modem 223 performs facsimile communications of image data with a facsimile machine on a PSTN (Public Switched Telephone Network). A network I/F 219 is an interface that connects the control unit 210 (MFP 110) to the LAN. The MFP 110 uses the network I/F 219 to transmit image data and information to each service on the internet and to receive various kinds of information.

Figure 3:
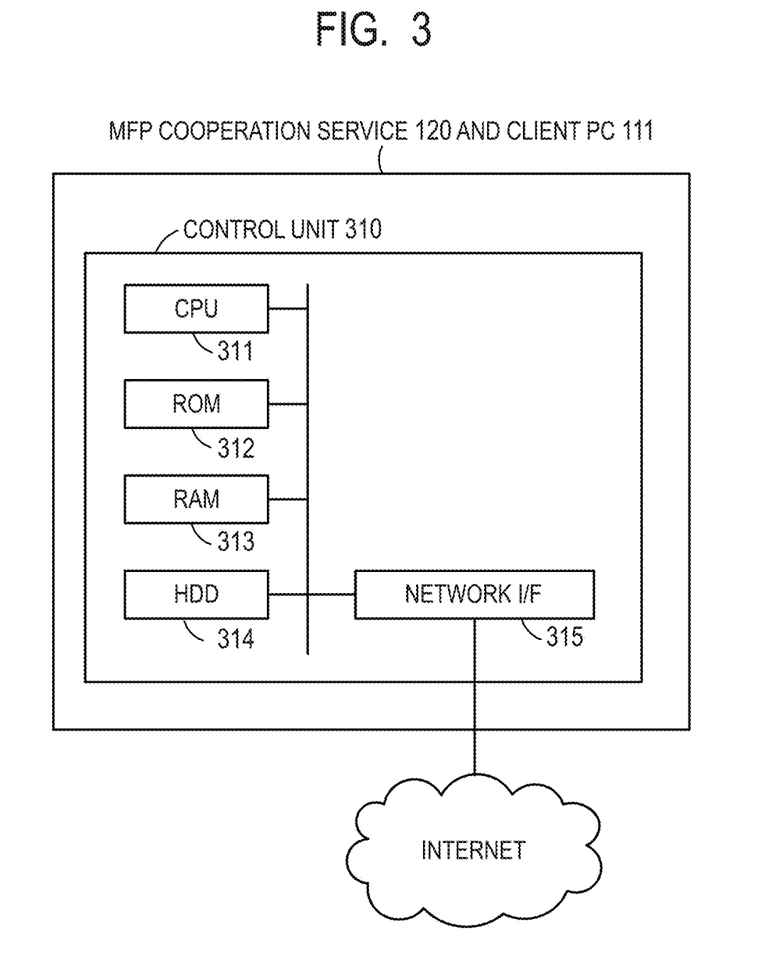
FIG. 3 illustrates a hardware configuration of a client PC and an MFP cooperation service.

FIG. 3 illustrates a hardware configuration of the information processing apparatus operating as the client PC 111 and the MFP cooperation service 120. The client PC 111 and MFP cooperation service 120 include a CPU 311, a ROM 312, a RAM 313, an HDD 314, and a network I/F 315. The CPU 311 controls the entire operation by reading a control program stored in the ROM 312 and executing various processes. The RAM 313 is used as a temporary storage area such as a main memory and a work area of the CPU 311. The HDD 314 is a mass storage unit that stores image data and various programs. The network I/F 315 is an interface for connecting the MFP cooperation service 120 to the internet. The MFP cooperation service 120 and the chat application 130 receive processing requests from other apparatuses (such as the MFP 110) via the network I/F 315 and transmit and receive various information.

Figure 4:
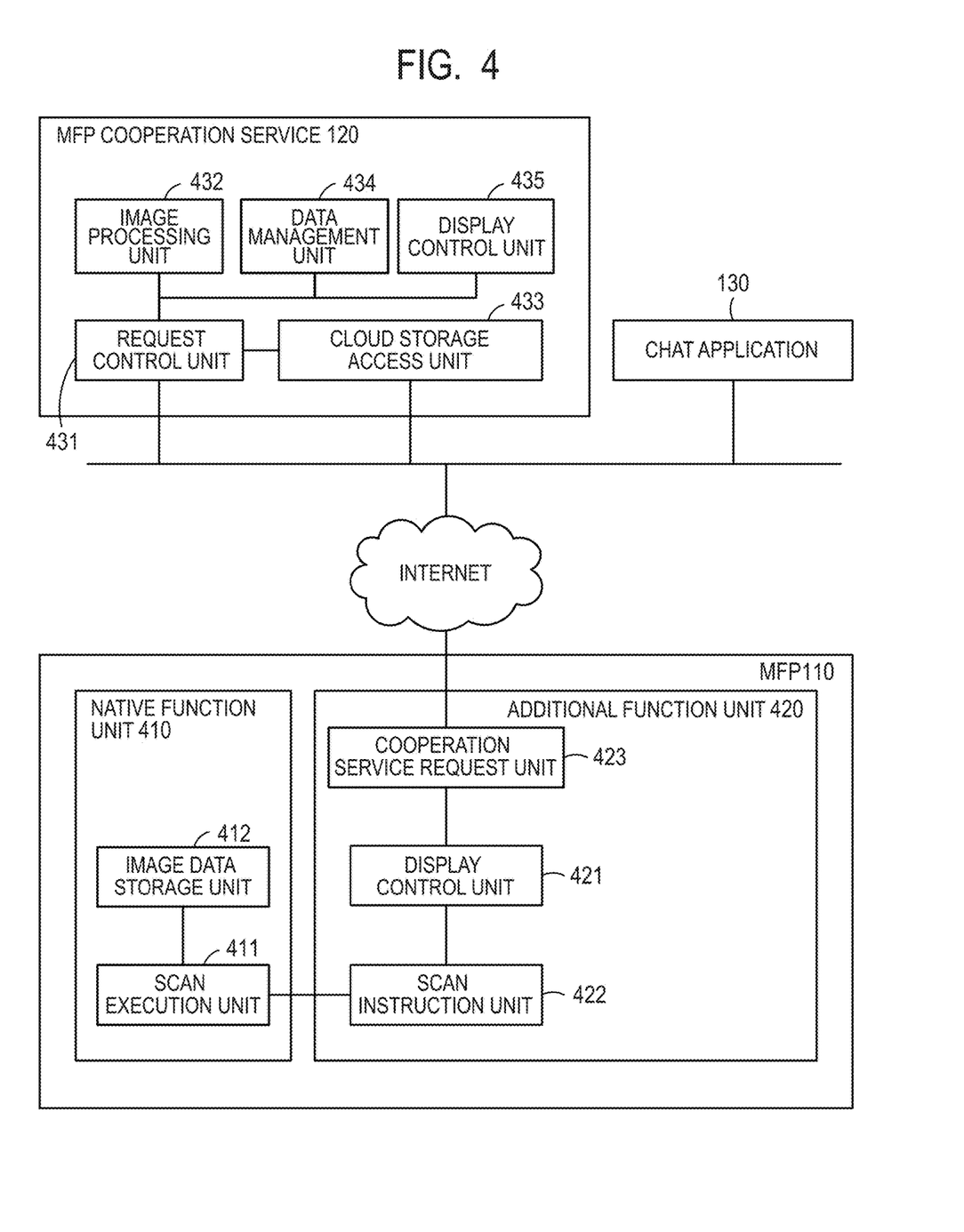
FIG. 4 illustrates a software configuration of the system of the present embodiment.

FIG. 4 is a software configuration diagram of the image processing system according to the present embodiment. The MFP 110 is roughly divided into two units: a native function unit 410 and an additional function unit 420. Each unit included in the native function unit 410 is standard in the MFP 110, while the additional function unit 420 is an application additionally installed in the MFP 110. The additional function unit 420 may be a Java®-based application and can easily add functions to the MFP 110. Other additional applications not shown may be installed in the MFP 110.

The native function unit 410 includes a scan execution unit 411 and an image data storage unit 412. The additional function unit 420 includes a display control unit 421, a scan instruction unit 422, and a cooperation service request unit 423.

The display control unit 421 displays a UI screen for receiving an operation by the user on a liquid crystal display unit having a touch panel function in the operation unit 220 of the MFP 110. For example, the display control unit 421 displays UI screens such as screens for inputting authentication information to access the MFP cooperation service 120, scan settings, starting scan operations, and a preview. The scan instruction unit 422 requests scan processing to the scan execution unit 411 together with scan settings according to the user instructions input via the UI screen.

The scan execution unit 411 receives a scan request including scan settings from the scan instruction unit 422. The scan execution unit 411 scans an original document placed on a platen glass using the scanner 222 via the scanner I/F 217 according to the scan request to generate scan image data. The generated scanned image data is transmitted to the image data storage unit 412. The scan execution unit 411 transmits a scan image identifier that uniquely indicates the saved scan image data to the scan instruction unit 422. The scan image identifier may be a number, symbol, alphabet, and the like (not shown) for uniquely identifying the image scanned in the MFP 110. The image data storage unit 412 stores the scanned image data received from the scan execution unit 411 in the HDD 214.

The scan instruction unit 422 obtains scan image data corresponding to the scan image identifier received from the scan execution unit 411 from the image data storage unit 412. The scan instruction unit 422 requests an instruction to perform processing on the obtained scan image data by the MFP cooperation service 120 to the cooperation service request unit 423.

The cooperation service request unit 423 requests various processing to the MFP cooperation service 120. For example, the cooperation service request unit 423 requests to log in, analyze a scanned image, or transmit a scanned image. protocols such as REST and SOAP may be used for interactions with the MFP cooperation service 120, but other means of communications may be also used.

The MFP cooperation service 120 has a request control unit 431, an image processing unit 432, a cloud storage access unit 433, a data management unit 434, and a display control unit 435.

The request control unit 431 waits in a state of being able to receive a request from an external apparatus. If the request control unit 431 receives a processing request, the request control unit 431 instructs the processing to the image processing unit 432, the cloud storage access unit 433, and the data management unit 434 according to the processing request.

The image processing unit 432 performs character area analysis, an OCR (Optical Character Recognition), similar form determination (to be described later in the process of step S510 in FIG. 5), image recognition processing, and image processing such as image rotation, tilt correction, and the like.

The cloud storage access unit 433 performs a processing request to the chat application 130. Cloud services releases various interfaces for storing files in the chat application 130 and obtaining stored files by typically using protocols like REST and SOAP. The cloud storage access unit 433 operates the chat application 130 using the published chat application interface.

The data management unit 434 holds user information, various setting data, and the like managed by the MFP cooperation service 120.

In response to a request from a web browser operating on other terminals (not shown) such as a PC or mobile connected via the internet, the display control unit 435 returns screen configuration information (HTML, CSS, etc.) necessary for displaying a screen. The users can check user information registered in the MFP cooperation service 120 via the screen displayed in the web browser and change settings for scanning.

Although an example of a configuration in which the additional function unit 420 is installed in the MFP 110 has been described in FIG. 4, the present disclosure is not limited to this configuration, and the client PC 111 may include the function of the additional function unit 420.

Figure 5:
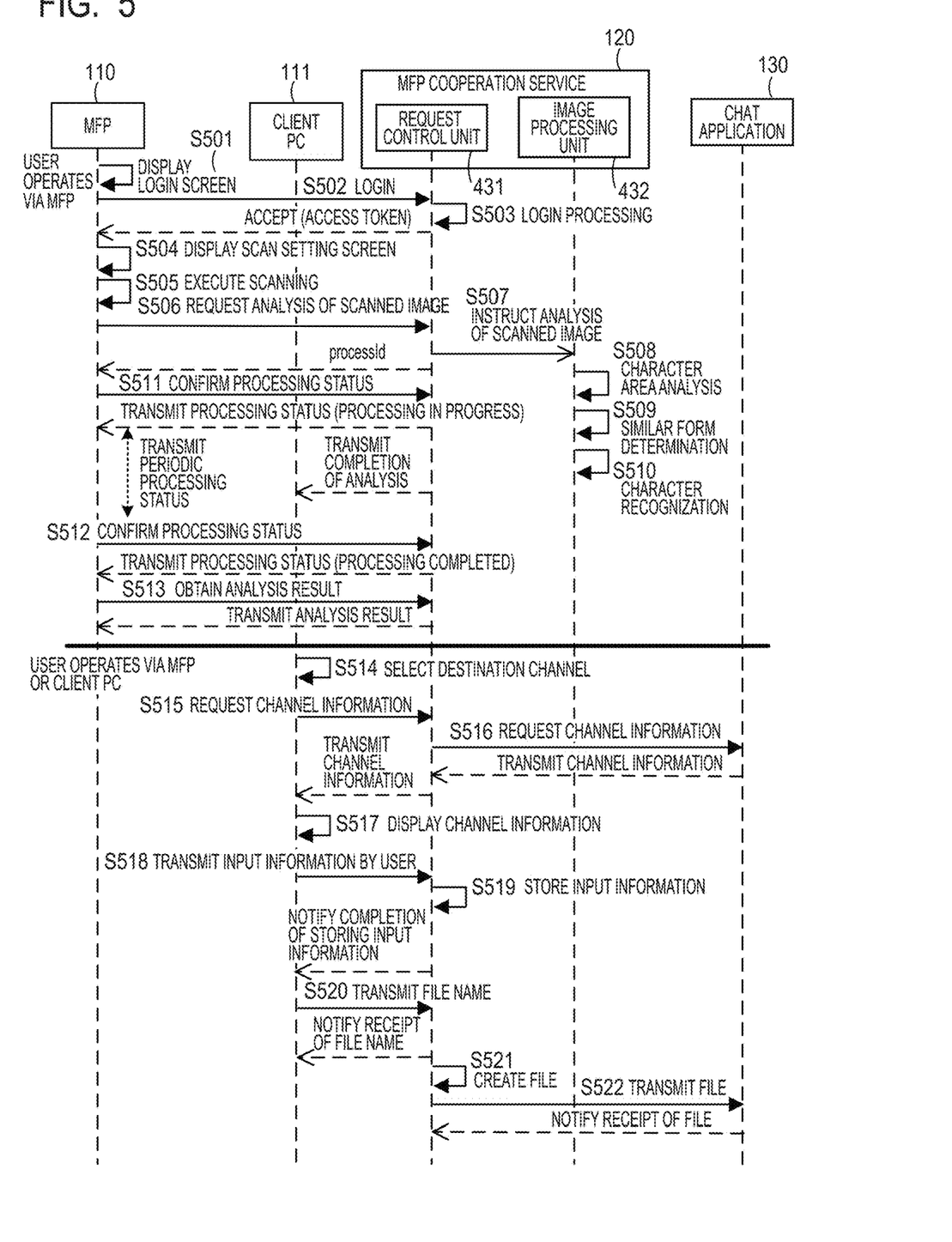
FIG. 5 illustrates a sequence diagram showing the flow of processing between each apparatus.

FIG. 5 illustrates a sequence diagram showing the flow of processing between apparatuses if the document image scanned by the MFP 110 is digitized as a file and transmitted to the chat application 130. Here, interactions between the apparatuses are focused on. In FIG. 5, the MFP 110 and the client PC 111 interact with the MFP cooperation service 120.

The MFP 110 displays a main screen on the touch panel with buttons for executing each function under normal conditions.

By installing an additional application (hereafter referred to as "a scanning application") on the MFP 110 to transmit scanned documents to the chat application 130, a button to use the application's functions appears on the main screen of the MFP 110. In response to pressing this button, the MFP 110 displays a screen for transmitting document images such as scanned forms to the chat application 130 on the main screen, and the processing shown in the sequence in FIG. 5 is performed.

In the following, information indicating that it is addressed to a designated user is referred to as a mention, and the function of adding the mention to a message to which a scanned document image is attached when transmitting the message is referred to as a mention function. A button that instructs the scanning application to add the mention to the message to which the scanned document image is attached is called a mention button.

In step S501, the MFP 110 displays a login screen for inputting authentication information for accessing the MFP cooperation service 120.

In step S502, the user performs a login operation, and the MFP 110 transmits a login user name and a password to the MFP cooperation service 120.

In step S503, the MFP cooperation service 120 verifies whether the user name and password included in the login request are correct or not. If the user name and password are correct, the MFP cooperation service 120 returns an access token to the MFP 110. The various requests from the MFP 110 to the MFP cooperation service 120 thereafter are requested together with this access token, and the user requesting the process can be identified by this information. The method of user authentication is generally performed using well-known techniques (Basic authentication, Digest authentication, authorization using OAuth, and the like).

If the login processing is completed, the MFP 110 displays a scan setting screen in step S504. The user makes settings for scanning a document, places a form sheet to be scanned on the platen glass or ADF, and presses a button for starting the scanning.

In step S505, the MFP 110 scans the form sheet to generate image data that digitizes the form sheet.

Then, in step S506, the MFP 110 transmits an analysis request of the scanned image data to the MFP cooperation service 120 along with the image data generated by the scanning processing. The MFP cooperation service 120 stores the scanned image data in the HDD of the MFP cooperation service 120 until the MFP cooperation service 120 transmits the scanned image data to the chat application 130.

Upon receiving the analysis request of the scanned image data, the MFP cooperation service 120 starts image analysis in the image processing unit 432 of the MFP cooperation service 120 in step S507. Then, without waiting for the completion of the image analysis processing, the MFP cooperation service 120 returns "processId" to the MFP 110. The "processId" is an identifier uniquely indicating the image analysis processing requested by the MFP cooperation service 120.

In step S508, the image processing unit 432 first analyzes a character area existing in the image as an image analysis processing. Then, in step S509, character recognition processing is performed on all character areas.

In step S510, the arrangement information of the character area in the form is used to compare the arrangement information of the image data scanned in the past with the arrangement information of the image data scanned this time. Based on the comparison, it is determined whether the image data with the arrangement of the similar character area is scanned. This process is called similar form determination. If there is an image data similar to a scanned image data in the past based on the similar form determination, an input information for the form is returned as an analysis result. On the other hand, if there is no image data similar to the scanned image data in the past, the MFP cooperation service 120 stores information about the character area of the entire scanned image data and information indicating that the scanned image data is not scanned in the past. Further, the MFP cooperation service 120 returns information indicating that the scanned image data is not learned as an analysis result. The information of the scanned image data in the past used in the determination is stored and accumulated by the processing of step S516 described later.

In step S511, the MFP 110 uses the "processId" received in the response of step S506 to confirm the processing status of the image analysis indicated by the "processId" periodically (for example, every several hundred to several milliseconds or so) with the MFP cooperation service 120. Although omitted in the figure, the processing in step S511 is continued until a response of image processing completion by the MFP cooperation service 120 can be obtained (until the timing in step S512). If the MFP cooperation service 120 receives the request to confirm the processing status in step S511, the MFP cooperation service 120 confirms the processing status indicated by "processId" and returns the response.

The response includes a string indicating the current processing status of the MFP cooperation service 120 in "status" information. For example, if "status" information is "processing", the response indicates that the processing is being performed by the MFP cooperation service 120. If "status" information is "completed", the response indicates that the processing is being completed. It should be noted that the MFP cooperation service 120 may return other statuses such as "failed" if the processing has failed. The response at the completion of processing (if "status" information is "completed") includes information such as the result of analyzing the scanned image data and scan settings along with the status.

If the completion of processing is detected in step S512, in step S513, the result information is obtained from the URL where the result information included in the response is stored. If the result is obtained from the request control unit 431 of the MFP cooperation service 120, the MFP 110 displays a message indicating that the scanning processing is complete on the screen of the MFP 110, and the process returns to the scan setting screen display in step S504.

The user then sets a file name for the scanned document on the client PC.

If there are a plurality of forms to be scanned, the user can cause the MFP 110 to repeatedly scan a plurality of the forms (repeating the process from steps S504 to S513) before setting the file name for the scanned document on the client PC. In a case where a setting for dividing scanned images by a predetermined number of pages is instructed before scanning, the MFP 110 can also scan a plurality of forms at once and divide the images of the scanned forms by the predetermined number of pages into multiple documents. In a case where a setting for dividing scanned images by dividers is instructed, the MFP 110 can also scan a plurality of forms with dividers inserted between each of the plurality of forms at once and divide the images of the scanned forms into multiple documents with the dividers.

Figure 6A:
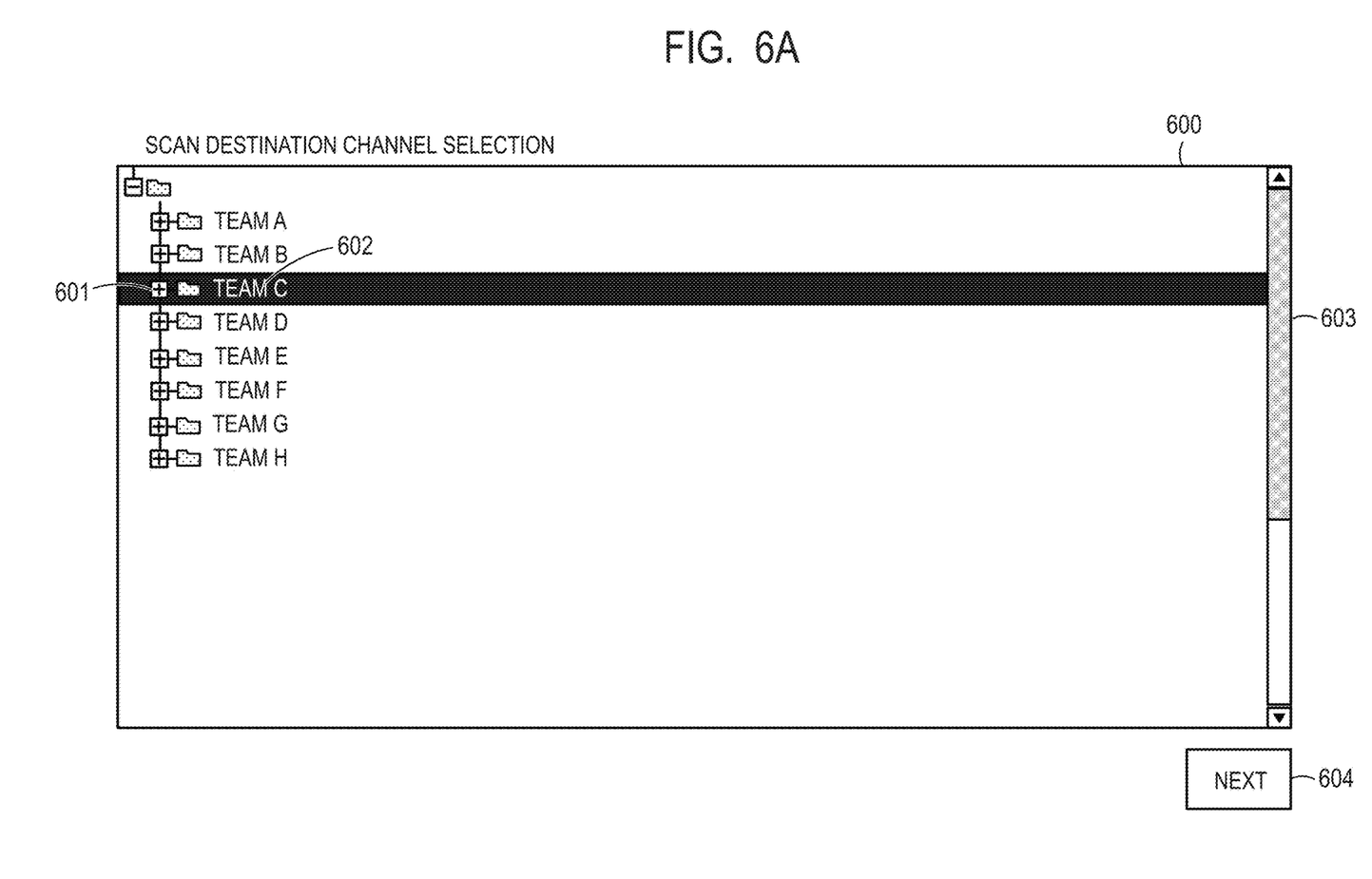
FIG. 6A illustrates an example of a screen displayed by the client PC.
Figure 6B:
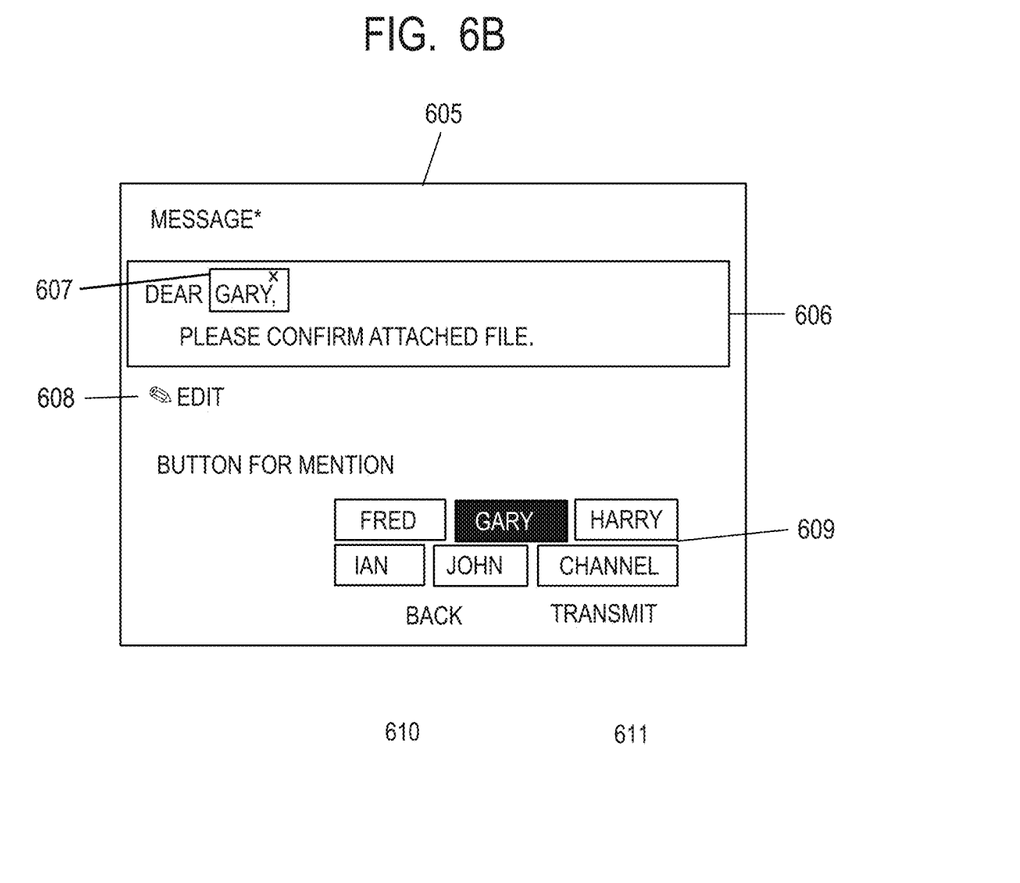
FIG. 6B illustrates an example of a screen displayed by the client PC.
Figure 7A:
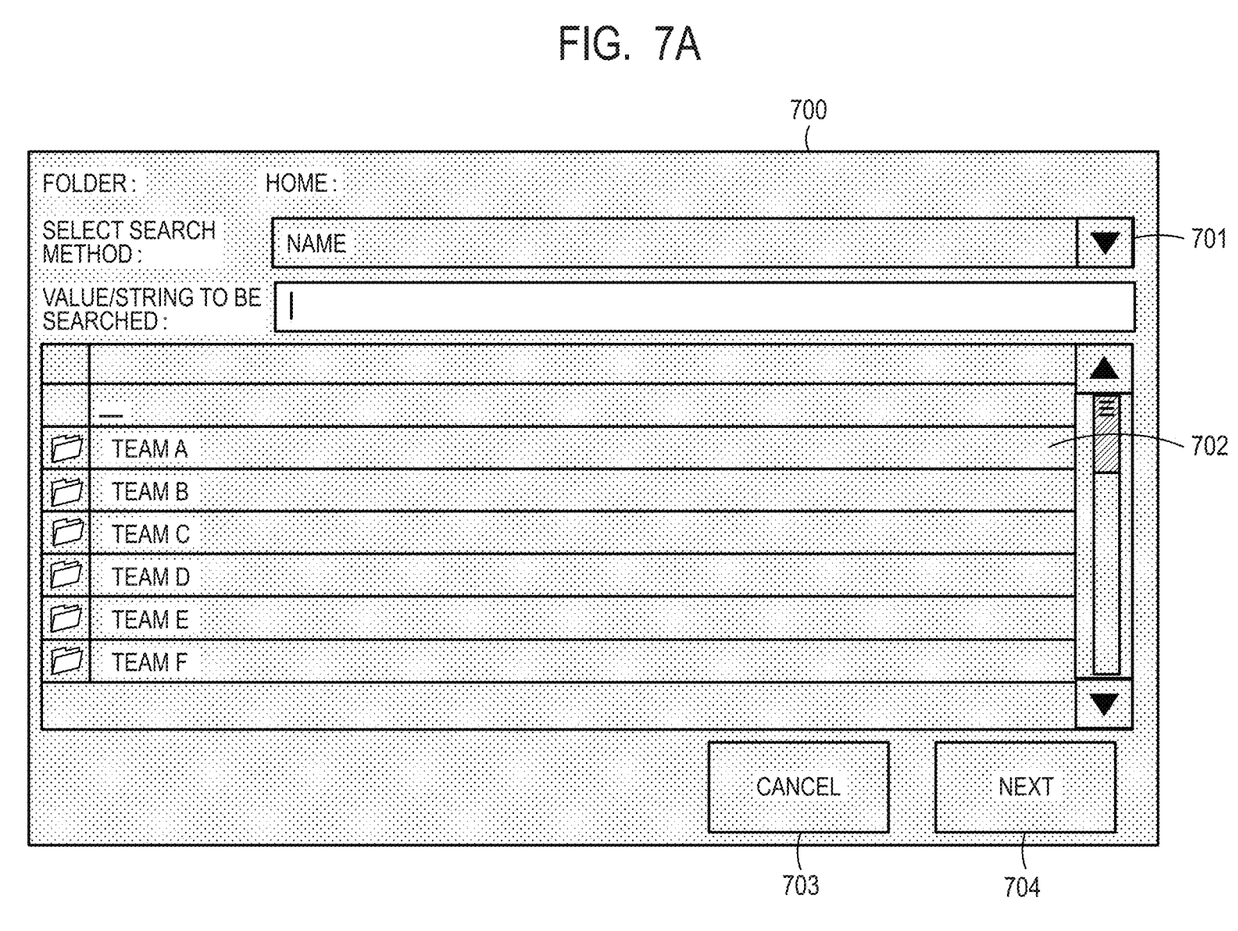
FIG. 7A illustrates an example of a screen displayed by the MFP.
Figure 7B:
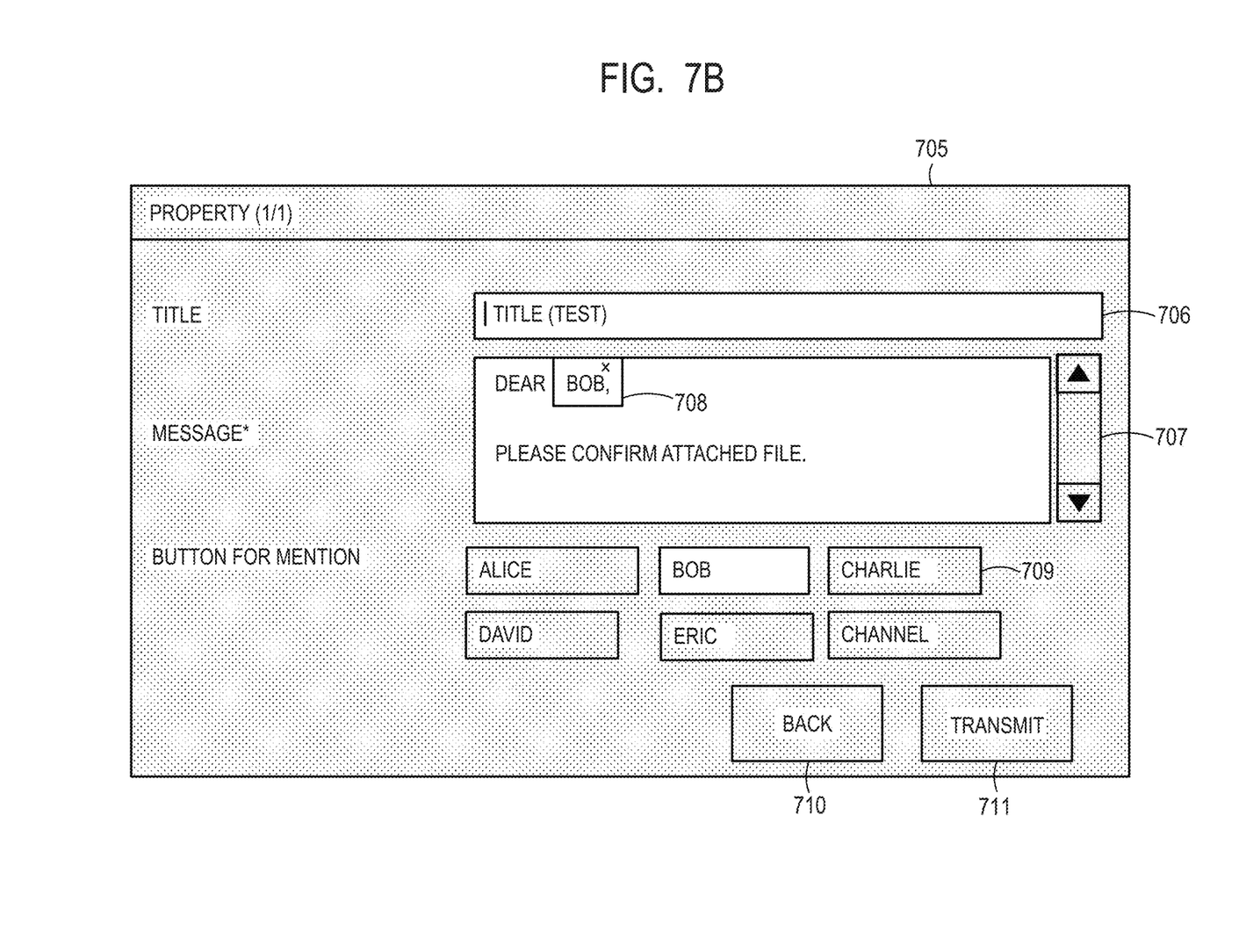
FIG. 7B illustrates an example of a screen displayed by the MFP.

In step S514, the user selects a destination channel to transmit the scanned document on the client PC 111. FIGS. 6A and 6B (hereinafter collectively referred to as FIG. 6) illustrate screens for selecting the destination channel in the MFP 110. FIGS. 7A and 7B (hereinafter collectively referred to as FIG. 7) illustrate screens for selecting the destination channel in the client PC 111. Details will be discussed later.

In step S515, the client PC 111 requests information of the user belonging to the destination channel selected in step S514 to the MFP cooperation service 120.

In order to respond to the request in step S516, the MFP cooperation service 120 requests user information related to the channel to the chat application 130. The client PC 111 then receives user information on the destination channel.

The client PC 111 displays a mention button of the user on the screen based on the user information of the channel obtained on the client PC 111 in step S517. This mention button is described in detail later in FIGS. 6 and 7.

In step S518, the client PC 111 transmits a request for learning the information of the character area used to set the file name to the MFP cooperation service 120. The MFP cooperation service 120 receives the request for learning, to request the image processing unit 432 to learn the form via the request control unit 431.

In step S519, the request control unit 431 stores the information of the character area of the entire image data and the input information of the character area used by the user for the file name received in step S517 in association with the channel, and returns to the client PC 111 that the storage has been successful.

In step S520, the MFP 110 transmits information such as the scanned image data and the file name to be set after the scanned image data are filed to the MFP cooperation service 120. If the MFP cooperation service 120 receives the request, the MFP cooperation service 120 starts file generation processing and returns to the client PC 111 that the request has been received successfully. If the client PC 111 receives the response of the transmission, the client PC 111 terminates the processing and deletes the transmitted form from the list.

In step S521, the MFP cooperation service 120 obtains information on the file format to be transmitted to the chat application 130 from the scan settings registered in the MFP cooperation service 120 to generate a file from the scanned image data based on the scan settings. Then, the file generated in step S521 is set to the file name received in step S520, and a message with a mention indicating the information of the destination is transmitted to the chat application 130.

FIGS. 6A and 6B illustrate an example of the screen displayed by the client PC 111. FIG. 6A illustrates a screen for selecting the destination channel displayed after scanning. A destination channel selection screen 600 in FIG. 6A includes a channel expansion button 601, a channel selection button 602, a scroll bar 603 and a next button 604. If the channel expansion button 601 is pressed, sub-channels included in the channel are expanded. If the channel selection button 602 is pressed, the destination channel for transmitting the scanned document can be selected. If the next button 604 is pressed, a message input screen 605 is displayed.

FIG. 6B illustrates the message input screen 605 displayed after the next button 604 is pressed in the destination channel selection screen 600. The message input screen 605 includes a message input field 606, a mention display field 607, an OCR selection button 608, a mention button selection field 609, a back button 610, and a transmit button 611. If the message input field 606 is pressed, the user can freely input a message, and the mention display field 607 displays a user name that serves as a mention function. By pressing the OCR selection button 608, the text described in the scanned document can be extracted by OCR processing, and the extracted text can be directly posted to the message input field 606. By pressing the mention button displayed in the mention button selection field 609, the name of the selected user is displayed in the message input field 606, and the selected user acts as a mention in the chat application 130. If an operator presses the mention button, the color of that button changes so the operator can see visually that the selected user name has already been typed in the message. If the back button 610 is pressed, the screen returns to the destination channel selection screen 600. If the transmit button 611 is pressed, the message or the mention object inputted for the scanned document is learned and the scanned document is transmitted. Details of the number of displayed mention buttons and user names are described in detail in the flowchart of FIG. 8.

FIGS. 7A and 7B illustrate an example of the screen displayed by the MFP 110. FIG. 7A illustrates a screen for selecting the destination channel that is displayed after scanning.

A destination channel selection screen 700 in FIG. 7A includes a channel search filter 701, a channel selection button 702, a cancel button 703, and a next button 704. If the channel search filter 701 is pressed down, a pull-down menu is expanded to select one of indexes to search for a user's desired channel. By selecting a channel with the channel selection button 702, the destination channel for transmitting the scanned document can be selected. If the cancel button 703 is pressed, the displayed screen returns to a home screen in MFP 110. If the next button 704 is pressed, a message input screen 705 is displayed (details will be described later).

FIG. 7B illustrates the message input screen 705 displayed after the next button 704 is pressed in the destination channel selection screen 700. The message input screen 705 includes a subject input field 706, a message input field 707, a mention display field 708, a mention button selection field 709, a back button 710, and a transmit button 711. The subject input field 706 and the message input field 707 can be freely input by the user on the MFP 110. The mention display field 708 reflects the name selected by the user in the mention button selection field 709 and serves as a mention. If the operator presses a mention button, the color of that button changes so the operator can see visually that selected user name has already been typed in the message. If the back button 710 is pressed, the screen returns to the destination channel selection screen 700. If the transmit button 711 is pressed, the message or the mention object inputted for the scanned document is learned and the scanned document is transmitted. As in FIG. 6, details of the number of displayed mention buttons and user names are described in detail in the flowchart of FIG. 8.

Figure 8:
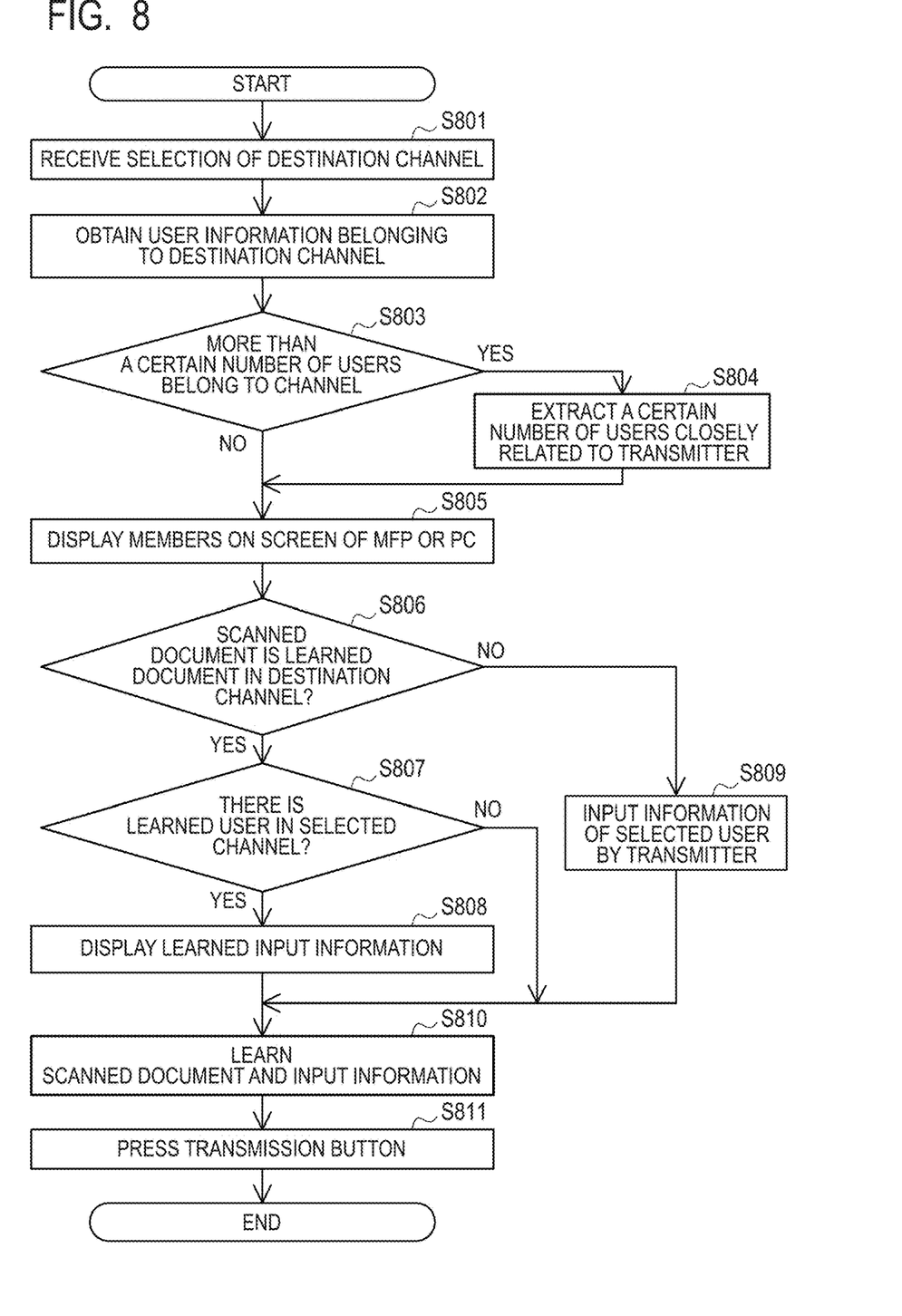
FIG. 8 illustrates a processing related to the mention function performed by the MFP cooperation service in the system.

FIG. 8 illustrates a flowchart showing details of the mention function performed by the MFP cooperation service 120 in the present system. This flowchart shows the process from selecting the destination channel of step S514 in the MFP 110 or the client PC 111 to transmitting the scanned document in step S520 of FIG. 5. The following flow is realized by the CPU 311 of the server running MFP cooperation service 120 deploys the program to RAM 313 and executes the program.

First, in step S801, the CPU 311 receives, from the MFP 110 or the client PC 1, the selection of a channel of the chat application 130 to transmit the scanned documents by the user via the screen (shown in FIG. 6A or 7A).

Then, in step S802, the CPU 311 obtains information on the destination channel via the API of the chat application 130. Specifically, the CPU 311 obtains information such as the names of users belonging to the channel and the number of users belonging to the channel.

In step S803, the CPU 311 determines whether more than a predetermined number of users belong to the channel. The predetermined number here refers to a number as many as the MFP 110 or the client PC 111 can display the mention buttons (609, 709) in the UI screen (605, 705) of the MFP 110 or the client PC 111. The user can decide the predetermined number of users. For example, in the message input screens 605 and 705 of FIG. 6B and FIG. 7B, it is determined whether seven or more users belong to the channel. In this example, a mention button for mentions to the channel itself are also counted as one of the mention buttons displayed in the UI screen of the MFP 110 or the client PC 111.

If it is determined that the predetermined number of users or more belong to the channel (Yes in step S803), the process proceeds to step S804. On the other hand, the process proceeds to step S805 if it is not determined that the predetermined number of users or more belong to the channel (No in step S803).

At step S804, the CPU 311 extracts only the predetermined number of users who are closely related to the operator and the process proceeds to step S805. For example, the users closely related to the operator may be the users frequently talking to the operator via the chat application 130.

In step S805, the CPU 311 displays the names of the users belonging to the channel or the users extracted in step S804 as mention buttons (609, 709) on the screen of the MFP 110 or the client PC 111.

Next, in step S806, the CPU 311 determines whether the image data is a scanned document having the same type as the document image data previously learned in step S518 of FIG. 5 in the destination channel received in step S801. If it is determined that the image data of the scanned document is the same type as the learned document image data (Yes in step S806), the process proceeds to step S807. On the other hand, the process proceeds to step S809 if it is not determined that the image data of the scanned document is the same type as the learned document image data (No in step S806). It is determined that the image data has the same type as the learned document image data if the arrangement of the character areas in the image data is same as or similar to the character areas in the learned document image data.

In step S807, the CPU 311 determines whether the destination channel includes learned and mentioned users. If it is determined that there are learned users (Yes in step S807), the process proceeds to step S808. On the other hand, the process proceeds to step S810 if it is not determined that there are learned users (No in step S807).

In step S808, the learned message is inputted into the message input field (606, 707) of the message input screen (605 shown in FIG. 6B or 705 shown in FIG. 7B), and the learned mention button is displayed in the pressed state in the mention button selection field (609, 709). A user name selected with the mention button is also automatically inputted in the mention display field (607, 708).

In step S807, if it is determined that there is no previously mentioned user (No in step S807), the screen of a default state with no input is displayed on the message input screen (605, 705).

If it is determined that the scanned document is an unlearned document in step S806, the screen of the default state is displayed on the message input screen 605 and the CPU 311 waits for the operator to press the mention button. The same arrangement is applied to the message input screen 705.

In step S809, the information (message, mention button) inputted by the user is stored, the input contents are stored in the MFP cooperation service 120 (step S519), and the process proceeds to step S810.

In step S810, the input contents are learned for the scanned document. Even if the input contents have already been learned, in a case where the operator has pressed a different message or different mention button again, the learned input contents are overwritten.

Finally, if the CPU 311 detects that a transmit button (611, 711) is pressed in step S811, the CPU 311 transmits a message to the chat application 130 with the mention, which is information to be specified as a destination on the scanned document.

According to this disclosure, when setting a group of recipients of scanned documents, information indicating that the documents are addressed to a user in the group can be easily attached. The operator then smoothly transmits the scanned document to a specific user, allowing the recipient to view the document without delay.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-186022, filed Nov. 15, 2021, which is hereby incorporated by reference herein in its entirety.

What is claimed is:

1. An information processing apparatus comprising:
a memory that stores instructions; and
a processor that executes the instructions to perform:
receiving a selection of a channel for a destination of a document image;
obtaining information of users belonging to the channel for the destination from an information sharing service;
displaying a button for each of the obtained information of users on a screen, and if the button is pressed, displaying a message including a user corresponding to the pressed button as a recipient in an input field of the screen; and
transmitting the message inputted on the screen and the document image to the channel of the information sharing service.

2. The information processing apparatus according to claim 1, wherein the processor executes the instructions to further perform:
associating, with the channel for the destination, and storing the transmitted document image and the information of the user included in the message transmitted with the document image; and
displaying, if the transmitted document image has a same type as a learned document image for the channel for the destination and the users belonging to the channel include a learned user along with the learned document image, the message including the learned user as the recipient in the input field of the screen.

3. The information processing apparatus according to claim 2, wherein the processor executes the instructions to further perform learning the document image if the transmitted document image does not have the same type as the learned document image for the channel for the destination.

4. The information processing apparatus according to claim 1, wherein a button corresponding to a user closely related to an operator is given priority and displayed if there are more than a predetermined number of users belonging to the channel.

5. The information processing apparatus according to claim 4, wherein the user closely related to the operator is defined as a user talking with the operator frequently via the information sharing service.

6. The information processing apparatus according to claim 1, wherein the processor executes the instructions to further perform:
displaying, if the transmitted document image has a same type as a learned document image for the channel for the destination and the users belonging to the channel do not include a learned user along with the learned document image, no message in the input field of the screen as a default state.

7. A method of controlling an information processing apparatus comprising:
receiving a selection of a channel for a destination of a document image;
obtaining information of users belonging to the channel for the destination from an information sharing service;
displaying a button for each of the obtained information of users on a screen, and if the button is pressed, displaying a message including a user corresponding to the pressed button as a recipient in an input field of the screen; and
transmitting the message inputted on the screen and the document image to the channel of the information sharing service.

8. A non-transitory computer readable storage medium that stores a program cause a computer to perform a method of controlling an information processing apparatus comprising:
receiving a selection of a channel for a destination of a document image;
obtaining information of users belonging to the channel for the destination from an information sharing service;
displaying a button for each of the obtained information of users on a screen, and if the button is pressed, displaying a message including a user corresponding to the pressed button as a recipient in an input field of the screen; and
transmitting the message inputted on the screen and the document image to the channel of the information sharing service.

* * * * *